United States Patent [19]

Pannwitz

[11] 4,402,108
[45] Sep. 6, 1983

[54] REDUCED STATIC CASTOR

[76] Inventor: Hans U. Pannwitz, P.O. Box 67, Odessa, Fla. 33556

[21] Appl. No.: 234,751

[22] Filed: Feb. 17, 1981

[51] Int. Cl.³ .............................................. B60B 33/08
[52] U.S. Cl. ...................................... 16/26; 308/6 R; 308/230
[58] Field of Search .................. 16/21, 24, 25, 26, 44, 16/46; 308/6 R, 230

[56] References Cited

U.S. PATENT DOCUMENTS

| 94,682 | 9/1869 | Wilson | 308/230 X |
|---|---|---|---|
| 652,127 | 6/1900 | Martin | 16/26 |
| 985,455 | 2/1911 | Russel | 16/26 |
| 1,053,895 | 2/1913 | Algermissen | 16/26 |
| 1,305,276 | 6/1919 | Gibson | 16/26 |
| 2,779,965 | 2/1957 | Schilberg | 16/24 X |
| 3,744,083 | 7/1973 | Jenkins | 16/26 |
| 4,060,252 | 11/1977 | Mowery | 280/79.1 R |

FOREIGN PATENT DOCUMENTS 641016 8/1950 United Kingdom ................... 16/26

*Primary Examiner*—Fred Silverberg
*Attorney, Agent, or Firm*—Frijouf, Rust & Pyle

[57] ABSTRACT

A caster is disclosed to provide a mobile support for a burden. The burden may be home or office furniture or may be industrial, laboratory or production equipment. The caster may be inverted and held in a stationary position, and used to support a moving conveyor. In short, the caster enables low friction and an instant way of changing direction on a full 360° plane with a minimum resistance to realign all casters involved into a new direction. The caster is built into a housing body having a semi-spherical socket with a ball caster smaller than the socket residing in the socket and thereby providing a space therebetween for holding a plurality of spherical bearings. The number of bearings is less than that required to fill the space in order to assure recirculation of the bearing balls. However, the balls are retained in the service position by a retainer and/or circular integral races built into the semi-spherical socket. The preferred embodiment of the invention places the support of the burden on the housing body at locations spaced from the vertical axis whereby any housing body flexure will be resisted by the bearing nearest the equator of the caster ball to maintain the spherical form of the socket and full bearing load on all bearings. In all embodiments, an antistatic and lubricating feature maintains the caster free of statically attracted dirt.

3 Claims, 6 Drawing Figures

REDUCED STATIC CASTOR

BACKGROUND OF THE INVENTION

1. Field of the Invention

This invention relates to casters for the rolling support of furniture and apparatus and more specifically to glove or ball casters with weight actuated breaking capabilities.

2. Description of the Prior Art

It appears that the industry learned very early that a chamber filled with bearing balls between a caster ball and a hemispherical housing would jam and bind the bearings. Some provided relief paths for recirculation and others supplied retainer cages. It appears from the prior art that the accepted approach to breaking was by allowing the ball structure to retract into the supported member whereby the supported member will contact the floor and act as a brake.

S. Szosiak et al, U.S. Pat. No. 1,186,244 requires internal shifting of the ball bearings to allow the caster ball to contact the friction surface of the ball race. Hence the number of bearings is severely limited. No bearings can be placed around the periphery where the shifting would allow a bearing to contact the ball below the diameter. To do so would lock the caster in the non-rotational position permanently. This patent employs a cage to hold bearing balls in place.

N. A. Rabelos, U.S. Pat. No. 3,096,536 is suitable for very lightweight furniture and light service. However, the ball is allowed to retract into the housing in order that the housing will contact the floor. There is no break adjustment possible and dirt can foul the ball seat while the ball is retracted and the housing lowered to the ground to render the burden stationary.

O. W. Jenkins, U.S. Pat. No. 3,744,083 attempts to provide circulation of small roller balls by means of a relief path allowing the small ball bearings to escape contact with the large caster bearing and return to the backside of the movement to return to rolling service. This is a modification of Smith, U.S. Pat. No. 488,954 issued in 1892 and Lennard, U.S. Pat. No. 491,710 issued in 1893.

Therefore it is an object of this invention to provide an apparatus which overcomes the aforementioned inadequacies of the prior art devices and provides an improvement which is a significant contribution to the advancement of the ball caster art.

Another object of this invention is to provide a caster which minimizes wheel lockup when encountering objects such as grains of sand, glass fragments, etc.

Another object of this invention is to provide a caster capable of providing precision movement on respective traveling surfaces.

Another object of this invention is to provide a caster with automatic means of locking when placed under a specific load.

A further object is to provide a caster with a means of breaking the caster globe through the internal design in contrast to the prior art of lowering the leg-support housing to the floor resulting in contracting and transmitting of foreign matter to the internal caster unit;

It is a still further object of this invention to provide a caster whch moves freely on changes in floor surface such as from terrazo or vinyl floors to soft carpeting.

A further object of this invention is to provide a caster with adjustable-controllable means of breaking the caster depending on the weight of the structure into which it is installed;

It is a further object of this invention to provide a caster with a design that minimizes the possibility of attraction of foreign matter and its entrance into the internal region mechanisms of the caster thereby preventing lockup;

A further object is to provide a caster with means of discharging counteracting static electric generation thereby minimizing attraction of foreign matter;

Another object is to provide a caster with a plurality of load receiving and transmitting bearing balls under minimum friction conditions;

A still further object of this invention is to provide a caster of a simple design series that is feasible and economical as to manufacture and marketing.

The foregoing has outlined some of the more pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description describing the preferred embodiment in addition to the scope of the invention defined by the claims taken in conjunction with the accompanying drawings.

SUMMARY OF THE INVENTION

The invention is defined by the appended claims with a specific embodiment shown in the attached drawings.

This invention is a new ball caster concept, with one embodiment including an improved locking brake system. The many variations of the configuration allows the caster to be easily adapted as a support for industrial use, furniture, or for supporting a conveyor or the like. The caster provides a mobile support for a burden of furniture or equipment and is built upon a housing body having a hemispherical socket.

A large caster ball, preferably of composition material, resides in the hemispheric socket and is separated from the socket by a plurality of spherical bearings. There are fewer bearings than sufficient to fill the space in order that free movement of the ball bearings can adjust to the direction of movement. The body of the structure is formed from a synthetic composition material. It has been discovered, according to this invention, that loading at the outer perimeter of the caster body will load the bearings evenly and give uniform caster action and long life.

A further developed embodiment employs a housing body with circular raceways which minimizes metal-to-metal contact between bearing balls and provides instead lubricating qualities between the bearing balls, represented by the choice of plastic, to minimize general friction.

Finally, internal movement of parts enables the locking of the caster sphere or ball into position without causing the body of the caster to contact the supporting floor.

In all versions there is provision made to reduce or completely eliminate static electricity which generally tends to befoul a bearing of this nature. The global caster of the invention will move responsibly with the same equal precision on glass or marble surfaces and can be incorporated with a tripod system in connection with an instrument measuring device system.

The cavity at the top of the global ball of FIGS. 1 and 2 indicates the intentional omittance of bearing balls to minimize friction between the balls while providing a space to allow the bearing balls to expand into this cavity, depending on the rate of load thus creating an increasing space between the ball bearings as the load increases. In FIGS. 1-3, a recess is required in the supported member to allow the body to penetrate into the supported burden and the weight of the burden is placed at the perimeter where the fastening devices attach the body to the burden.

In FIG. 5, the table or furniture leg abuts the body at the extreme outer perimeter and causes a clamping action of the body upon the bearings around the perimeter of the ball.

In FIG. 6, the spring similarly responds to loads at the center of the body and causes a closing flexure toward the balls 3, resulting in a breaking effect of the same. Because the ball 3 and the body of the caster are both of synthetic materials having inherent lubricating properties, the use of separated bearing balls by the partition raceways between the two bodies provides maximum response with minimum friction.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION

Figure 1:
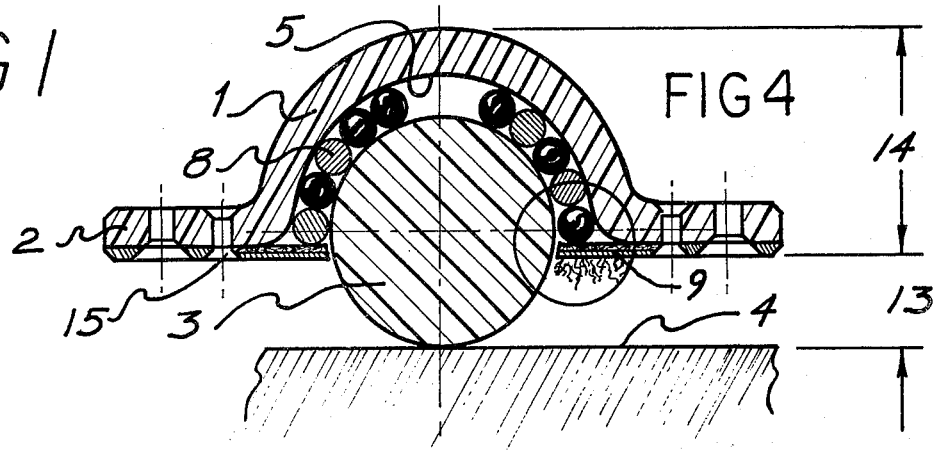
FIG. 1 illustrates a simple version of a caster bearing with fewer than sufficient balls filling the bearing space and an illustration of the static electricity attraction or retainer means in prior art practice.
Figure 2:
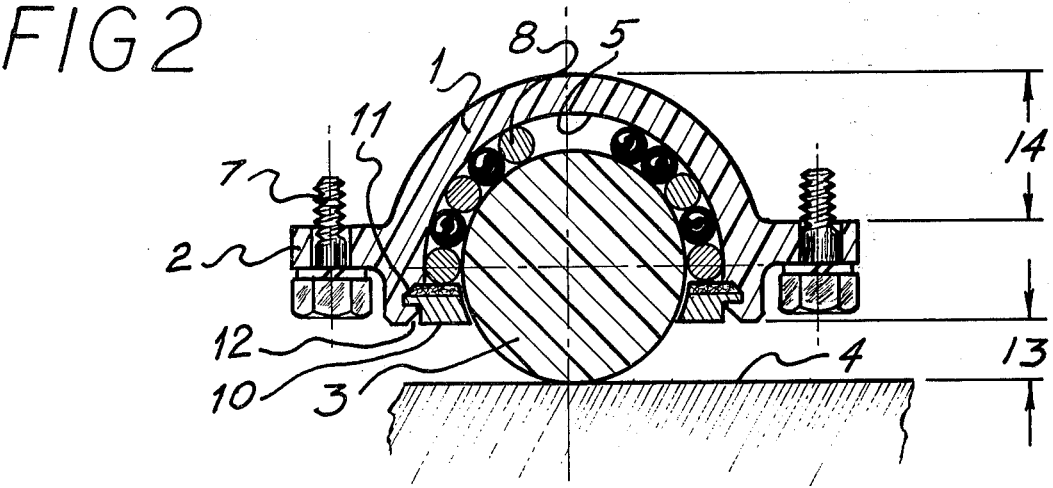
FIG. 2 illustrates a modification of the means of retaining the ball and bearing balls using a snap set retaining ring instead of rivets.
Figure 3:
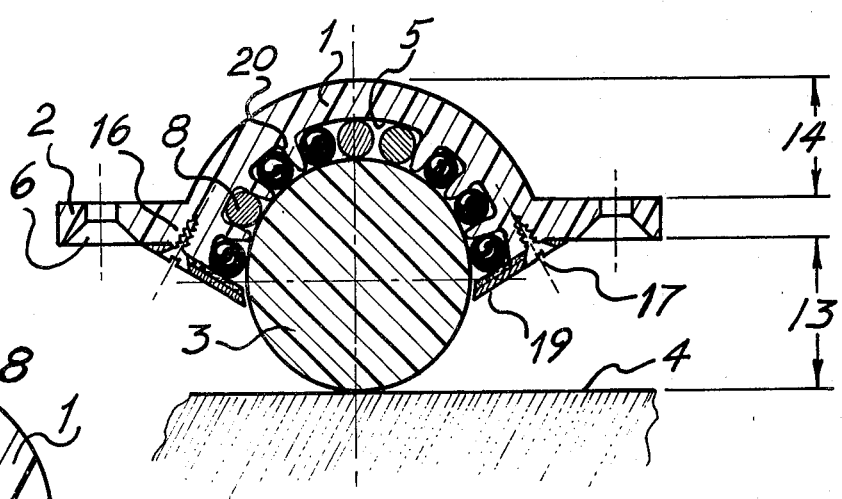
FIG. 3 shows an improvement compared to FIGS. 1 and 2 in the provision of extra floor clearance height, partitioning ribs to separate clusters of balls, thereby minimizing friction and enhancing manufacturing simplicity.

FIGS. 1-3 illustrate a progression of development of the invention. A housing 1 includes a mounting flange 2 for receiving a ball caster 3. Although the caster is primarily intended for the support of structures intended to be movable in a limited scope, the invention may be inverted for supporting a surface passing over the caster, such as for example, a conveyor. In the drawings, a floor 4 is illustrated as smooth, hard surfaces that most usually frustrate the smooth movement of a ball caster. This invention will provide movement under the least resistance on smooth, hard floors as well as very soft shag carpeting. The structure minimizes or completely eliminates caster locking when encountering small floor objects like grains of and, glass fragments, and similar hard pieces due to the point contact presented by the caster global ball. The improved anti-friction concept developed by this invention materially helps to alleviate lock up on a surface. The housing body in all embodiments illustrated has a semi-spherical inner bearing surface indicated by the reference character 5.

A caster must be attached to the object being supported, and there are five different illustrations in the drawing to give ample teaching for the use of this invention in all environments. In FIGS. 1 and 3, a screw socket 6 provides the means for attaching the housing to the bottom surface of a supported device by means of flathead screws or bolts. In FIG. 2, a hex head bolt 7 secures the caster to the object (not shown).

Bearing balls 8 and global (wheel) ball 3 will be made from a large variety of different synthetic materials, possibly including reject steel ball bearings, hard rubberwood, glass or ceramics, depending on the application needs and research results.

In FIGS. 1 and 2, the raceway between the smaller diameter ball 3 and the larger semi-spherical cavity 5 is not fully filled with the balls. This space provides room for the balls which are forced toward the direction of movement to escape and return to the top of the cavity to prevent binding.

Figure 4:
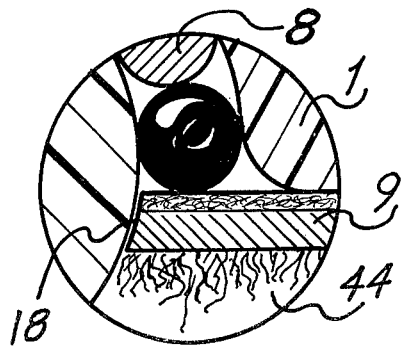
FIG. 4 is an enlarged view of an area circled in FIG. 1 showing the immediate retaining area and the clearance between the ball and the static discharge retaining plate. It also illustrates how the retaining plate has absorbed some of the static electricity from the ball and consequently collected floor fibers.

In FIG. 1, the cavity between the ball 3 and the hemispherical cavity 5 is closed by means of a retainer 9. The reference character 15 refers to a rivet to fasten the retaining plate 9 onto the housing. In FIG. 4, the enlargement illustrates the absorption of static electricity by retaining plate 9 from ball caster 3 which was generated between the surface engagement of ball 3 and floor surface materials, which have a tendency to be of a fibrous material.

In FIG. 2, a snap ring 10 is illustrated as the cavity closing means. The ring 10 is resilient in nature and the housing 1 is made of slightly flexible cast plastic material which will permit a degree of flexure when unattached from the supported burden. Therefore, the ring 10 is provided with a cam surface 11 and the entrance to the hemispherical portion 5 is chamfered at 12 in order that the ring may be forced toward the ball cavity to cam apart the housing and allow the snap ring to enter into the mating cavity in the housing.

In all illustrations, the reference character 13 illustrates the floor clearance and the reference character 14 as the dimension required for installation.

In FIG. 3 a self-threading flat head screw 16 is shown for attaching the retaining member 19 to the housing. Screw 16 has a driving slot 17 but a Phillips head slot and other screws or rivets may be employed.

In the prior art, one can find teaching against the design of ball bearings for roller casters which allow the balls to jam toward the direction of rolling by abuting one another to bind and cease providing a roller bearing function. To this end, there are two separate approaches, both of which appear to be satisfactory. First, as early as 1892, W. J. Smith, U.S. Pat. No. 488,954 taught a release system whereby the balls could circulate in a race which included a part of the race as the active bearing. One year later, P. J. Lennard, U.S. Pat. No. 491,710, illustrated yet another relief system allowing recirculation. This concept is reemphasized again in 1973 by Albert Jenkins, U.S. Pat. No. 3,744,083.

However, Szosiak et al, U.S. Pat. No. 1,186,244 issued in 1916 and Oppenheimer, U.S. Pat. No. 2,687,546, issued in 1954, employ bearing balls captured in position, although separated from one another, to provide the ball bearing function.

According to this invention, the use of fewer balls than necessary to fill the cavity will provide ample circulation, but the illustration in FIGS. 3-6 show the preferred embodiment of a plurality of circular raceways around the socket defined by walls 20, each raceway with a center on the vertical axis of the caster ball with bearings residing in the raceways. These bearings are freely movable within their own raceways which provides means for lubrication and friction reduction by the choice of material, and hence in the drawing, some are cross-hatched and some are shown as full surface. Such a situation would exist because the bearing balls are not aligned with one another but are freely moving. The raceways have a further useful function in that the housing is inverted during assembly and the proper number of balls placed in each raceway. The balls are easily assigned in proper number to their respective positions of service.

Preferably, the housing in each of the embodiments is a synthetic material, referred to as plastic, to be selected from a large variety of plastic material whose characteristics include low friction and pressure resistance, which enable the balls to rotate freely in the raceways without binding. Thus the balls are separated from one another by fewer balls in the race than necessary to fully fill the race, and by the partition walls 20 which prevent adjacent rows from contact.

FIG. 4 illustrates an enlarged view of an area circled at FIG. 1 to provide a clearer view of the immediate retaining area and to show the clearance 18 between the global ball 3 and static discharge bearing ball retaining plate 9. Also illustrated is the manner in which the static discharge retaining plate 9 has absorbed some of the static electricity from global ball 3 and, consequently, has collected floor fibers consisting of carpet material fragments, and pet and human hair 44.

This global ball, particularly when made from a plastic material, functions as a static electricity generator, therefore various measures to counteract this unpleasant phenomena are illustrated in FIGS. 1-6.

The retainers 9, 10 and 19 illustrated in FIGS. 1-3 act in the manner described above. In addition, a minimum clearance 18 is provided for the global ball to rotate freely.

Figure 5:
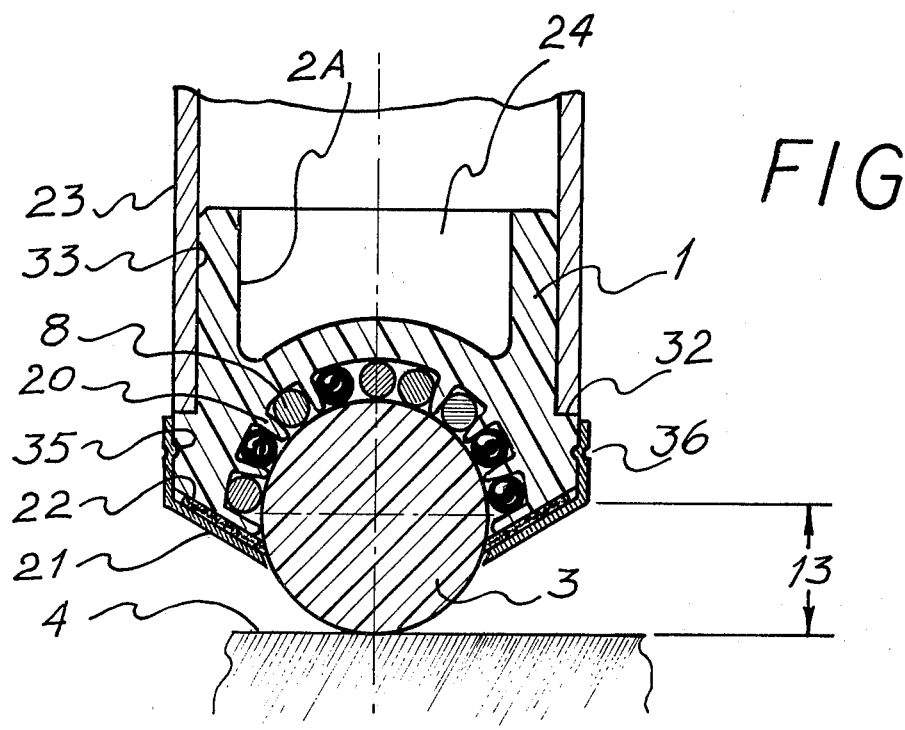
FIG. 5 is an adaptation of the basic concept of this invention into a furniture or equipment leg as opposed to attachment by fastening devices.

To further counteract the generation of static electricity, washer 22 is placed behind the retainer (now transformed into a cap 21 of FIG. 5). Felt washer/wiper 22 is impregnated with a static electricity cancelling substance and a super lubricant to enhance the lubrication of the surface 46 of global ball 3 during floor surface contact and particularly during the moving relationship of surface 46 with the surfaces of the various bearing balls 8.

Figure 6:
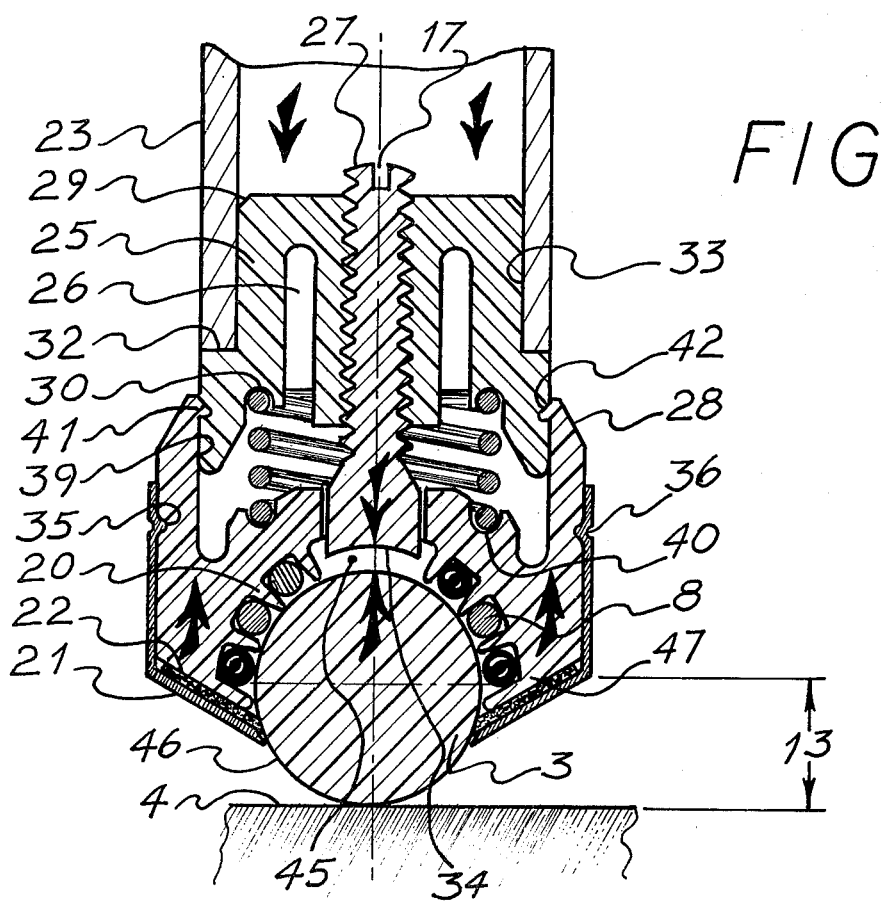
FIG. 6 is an illustration of the invention as adapted to a self-breaking construction under a predetermined load.

FIGS. 5 and 6 illustrate advanced embodiments of the invention. The reference character 21 indicates a flashing cap 21 to hold wiper pad 22 in position. Flashing cap 21 is secured to caster housing 1 by means of a convex internal protrusion created by circular concave collars 36 of flashing cap 21 wall which collars become engaged with groove 35 provided in the lower portion of caster housing 1. Felt wiper 22 is secured between the outer surface of the extra-heavy rib partition 47 at the lower end of the bearing housing and the inner surface of the retaining cap 21. The pad 22 is a wick to hold an anti-static and lubricant to wipe the surface of the caster ball 3. The ball 3 is preferably of a composition material which prevents static electricity generation. Additional lubrication with anti-static materials provided by wiper pad 22 materially reduces or completely eliminates the tendency to build up that static electricity. The static electricity is undesirable because it attracts fibers and dirt that collects among the bearing balls.

Reference character 23 indicates a furniture leg terminal portion into which the body portion of housing 1 may extend. In this embodiment, the flanges 2A are the mounting equivalent of the mounting flanges 2 in FIGS. 1-3. Flanges 2A extend upwardly in a cylindrical fashion. A cavity 24 maintains an even, overall wall thickness, which is important with respect to the curing time during injection molding.

In FIG. 6 a mounting body 25 is cylindrical in form to fit into the leg 23. A chamber 29 enables easy entrance of the mounting body 25 into the leg 23. Mounting body 25 is secured to leg portion 23 by means of surface friction at the mounting body wall 33 whereby the main burden of vertical caster load is captured by shoulder 32. Also illustrated in FIG. 6 is brake pad 27 with a threaded stem portion extending through the center of mounting body 25. Screw slot 17 adjusts the longitudinal position of the brake pad at the lower end along the central axis of the mounting body 25.

The mounting body 25 has a spring seat 30 for supporting the body upon a coil spring 31. A shoulder 32 on the mounting body enables the burden from the leg 23 to rest upon the mounting body 25. Main housing 1 has a spring seat 40 for transfer of the burden between the mounting body 25 and the housing 1.

In the lightly loaded condition the spring will separate the housing 1 and the mounting body 25 to approximate the position shown in FIG. 6. At that position a lip 41 on the upstanding cylindrical retaining wall 28 is seated in a mating detent groove encircling the mounting body 25. The mounting body and housing have mutually chamfered surfaces 42 whereby pressure by the burden in excess of the ability of the spring to support the burden will cause a disengagement of the wall 28 of housing 1 and mounting body 25. The spring may then be further collapsed and the wall 28 will telescope with the external surfaces of the mounting body to allow the brake surface 34 to contact surface 46 of the caster 3 and cause the caster to lock into a stationary position. Normally there is a space 45 separating the brake surface 34 from the ball caster 3.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A castor to provide mobile support for a burden of furniture or equipment, comprising:
    a housing body having a semi-spherical socket, said socket having a vertical axis extending through the spherical center thereof;
    a spherical member of smaller diameter than the socket residing in said socket with a space therebetween;
    a plurality of spherical bearings positioned in the space between the socket and spherical member;
    retainer means for closing the space at the terminus of said socket to lock the bearings into the space between the socket and spherical member; including means disposed between said body and said retainer means for wiping the surface of said spherical member with an anti-static chemical; and
    a flange disposed on said housing body, said flange supporting the burden at locations spaced from said vertical axis such that any flexure of said housing body resulting from the burden will be resisted by said bearings disposed nearest to said retainer means to maintain said socket in a semi-spherical configuration and to maintain a full distribution of bearing load among all of said bearings.

2. A caster as defined in claim 1, having a plurality of circular raceways around the socket,
    each of said circular raceways having a center disposed on the vertical axis, and
    said bearings residing in the raceways.

3. A castor as defined in claim 1, wherein said spherical member is a hard cast synthetic resin and the housing body is of a synthetic resin having a relatively low coefficient of friction and having a pressure resistant characteristic.

* * * * *

UNITED STATES PATENT AND TRADEMARK OFFICE
CERTIFICATE OF CORRECTION

PATENT NO. : 4,402,108
DATED : September 6, 1983
INVENTOR(S) : Hans U. Pannwitz

It is certified that error appears in the above-identified patent and that said Letters Patent is hereby corrected as shown below:

Column 1, line 8, "glove" should read -- globe --.

Column 6, line 40, "chamber" should read -- chamfer --.

Signed and Sealed this

Third Day of January 1984

[SEAL]

Attest:

GERALD J. MOSSINGHOFF

Attesting Officer

Commissioner of Patents and Trademarks